(12) United States Patent
Takahashi

(10) Patent No.: US 12,026,242 B2
(45) Date of Patent: Jul. 2, 2024

(54) KEY GENERATION APPARATUS, KEY UTILIZATION APPARATUS, AND KEY GENERATION METHOD

(71) Applicant: Hitachi, Ltd., Tokyo (JP)

(72) Inventor: Kenta Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 289 days.

(21) Appl. No.: 17/779,202

(22) PCT Filed: Sep. 18, 2020

(86) PCT No.: PCT/JP2020/035536
§ 371 (c)(1),
(2) Date: May 24, 2022

(87) PCT Pub. No.: WO2021/106334
PCT Pub. Date: Jun. 3, 2021

(65) Prior Publication Data
US 2022/0405369 A1 Dec. 22, 2022

(30) Foreign Application Priority Data
Nov. 29, 2019 (JP) .................... 2019-216479

(51) Int. Cl.
*G06F 21/32* (2013.01)
*H04L 9/06* (2006.01)
(Continued)

(52) U.S. Cl.
CPC .......... *G06F 21/32* (2013.01); *H04L 9/0643* (2013.01); *H04L 9/0866* (2013.01)

(58) Field of Classification Search
CPC ...... G06F 21/32; H04L 9/0643; H04L 9/0866
(Continued)

(56) References Cited

U.S. PATENT DOCUMENTS

| | | | |
|---|---|---|---|
| 10,690,766 B2 * | 6/2020 | Miranda | G01S 7/412 |
| 2008/0235515 A1 * | 9/2008 | Yedidia | G06V 40/193 |
| | | | 713/186 |

(Continued)

OTHER PUBLICATIONS

European Search Report issued on Nov. 23, 2023 for European Patent Application No. 20893777.1.
(Continued)

*Primary Examiner* — Haresh N Patel
(74) *Attorney, Agent, or Firm* — Volpe Koenig

(57) ABSTRACT

A key generation apparatus for accomplishing high precision authentication in biometric encryption and biometric signing based on feature vectors in a high-dimensional Euclidean space, the apparatus: holds a first feature vector indicating a feature of first biometric information, and a parameter for identifying one arrangement out of a sphere packing arrangement with a density less than 1 and more than a predetermined value, or a sphere covering arrangement with a density equal to or more than 1 and less than a predetermined value, identifies one arrangement out of the sphere packing arrangement or the sphere covering arrangement based on the parameter; selects a first point included in the identified one arrangement; generates a first key by predetermined first conversion on the first point; and generates, based on the first feature vector and the first point, a template associated with the first biometric information.

10 Claims, 6 Drawing Sheets

(51) Int. Cl.
*H04L 9/08* (2006.01)
*H04L 9/32* (2006.01)

(58) Field of Classification Search
USPC .......................................................... 713/186
See application file for complete search history.

(56) References Cited

U.S. PATENT DOCUMENTS

| | | | | |
|---|---|---|---|---|
| 2012/0284572 | A1* | 11/2012 | Shirakawa | G06F 16/24558 707/769 |
| 2014/0201126 | A1* | 7/2014 | Zadeh | A61B 5/165 706/52 |
| 2015/0178547 | A1* | 6/2015 | Bahjat | G06V 40/193 382/117 |
| 2017/0164878 | A1* | 6/2017 | Connor | G09B 19/00 |
| 2018/0204111 | A1* | 7/2018 | Zadeh | G06V 10/764 |
| 2019/0342102 | A1 | 11/2019 | Hao et al. | |

OTHER PUBLICATIONS

Dodis, Y., Reyzin, L., Smith, A., "Fuzzy Extractors: How to Generate Strong Keys from Biometrics and Other Noisy Data." In: Cachin C., Camenisch J. L. (eds) Advances in Cryptology—EUROCRYPT 2004. Lecture Notes in Computer Science, vol. 3027, Springer, Berlin, Heidelberg, Internet <URL: https://www.iacr.org/archive/eurocrypt2004/30270518/DRS-ec2004-final.pdf>, p. 1.

Yuta Yoneyama, et al., "Closest Vector Problem on Triangular Lattice and its Application to Fuzzy Signature," IEICE Transactions (A), vol. J98-A, No. 6, pp. 427-435, Jun. 2015.

Gilkalaye, B.P., et al., "Euclidean-Distance Based Fuzzy Commitment Scheme for Biometric Template Security," 2019, 7th International Workshop on Biometrics and Forensics, Jun. 3, 2019, pp. 1-6, in particular, II. A. Proposed Scheme 1, etc.

* cited by examiner

KEY GENERATION APPARATUS, KEY UTILIZATION APPARATUS, AND KEY GENERATION METHOD

CLAIM OF PRIORITY

The present application claims priority from Japanese patent application JP 2019-216479 filed on Nov. 29, 2019, the content of which is hereby incorporated by reference into this application.

BACKGROUND

The present invention relates to a key generation apparatus, a key utilization apparatus, and a key generation method.

Biometric authentication technologies for authenticating an individual based on fingerprints, veins, a face, an iris, or other types of biometric information are widely used. With the biometric authentication technologies of the related art, feature data (a template) extracted from biometric information of a user is registered in a system in user registration, feature data extracted again from biometric information of the user is compared to the template in user authentication, and the authentication is determined to be a success when a distance between the two is close enough and, otherwise, a failure.

However, biometric information is generally irreplaceable information and, once leaked, poses a serious problem. To address this issue, template protecting biometric authentication technologies for executing authentication with biometric information kept secret are being researched and developed. Those technologies include a technology called biometric encryption in which key data is generated from biometric information to execute cryptographic authentication, encryption, signature generation, and other types of processing.

In biometric encryption, feature data X of biometric information is converted and a secret key K is embedded as well in registration, to thereby create a protected template T. Subsequently, the secret key K is restored from feature data X' of newly obtained biometric information and the protected template T. When the restoration succeeds, cryptographic authentication, encryption and decryption, generation of an electronic signature, and other types of processing can be executed with the use of the restored secret key K. In biometric encryption, restoration or deduction of X from T is required to be sufficiently difficult (a requirement on safety). In addition, processing of restoring the secret key is required to succeed when, and only when, the distance between X' and X is close.

Examples of a method of implementing biometric encryption are described in Dodis, Y., Reyzin, L., Smith, A., "Fuzzy Extractors: How to Generate Strong Keys from Biometrics and Other Noisy Data." In: Cachin C., Camenisch J. L. (eds) Advances in Cryptology—EUROCRYPT 2004. Lecture Notes in Computer Science, vol. 3027, Springer, Berlin, Heidelberg, Internet <URL: haps://www.iacr.org/archive/eurocrypt2004/30270518/DRS-ec2004-final.pdf>. The examples include a method applicable when the feature data X and the feature data X' are expressed as bit strings and proximity between the two is defined by the Hamming distance, and a method applicable when the feature data X and the feature data X' are expressed as sets and proximity between the two is defined by $|X-X'|+|X'-X|$.

Meanwhile, in many of pattern recognition methods which are a basis of biometric authentication, feature data is expressed as a vector in a high-dimensional Euclidean space, and proximity is defined by the Euclidean distance or a normalized Euclidean distance (including the cosine distance and normalized cross-correlation). For example, a method of extracting and cross-checking feature vectors from a face image with the use of deep learning and a method of extracting and cross-checking feature vectors by performing principal component analysis, discrimination analysis, phase-only correlation, or the like on fingerprint images, palm print images, vein images, or various other images can be regarded as a method of extracting feature vectors of a high-dimensional space from biometric information and cross-checking the feature vectors by the Euclidean distance.

However, the methods as described in "Fuzzy Extractors: How to Generate Strong Keys from Biometrics and Other Noisy Data" are inapplicable to the Euclidean distance. A method as described in Yoneyama Yuta, Takahashi Kenta, Nishigaki Masakatsu, "Closest Vector Problem on Triangular Lattice and its Application to Fuzzy Signature," IEICE Transactions (A), vol. J98-A, no. 6, pp. 427-435, June 2015 therefore attempts to accomplish biometric encryption and biometric signing based approximately on the Euclidean distance by using a triangular lattice.

SUMMARY

However, the method as described in "Closest Vector Problem on Triangular Lattice and its Application to Fuzzy Signature" has empirically been proven to have a problem in that precision of authentication rapidly (exponentially) drops with an increase in the order of dimension. It is therefore difficult to accomplish a practical precision of authentication by applying the method to actual biometric information.

It is therefore an object of at least one aspect of this invention to accomplish high precision authentication in biometric encryption and biometric signing based on feature vectors in a high-dimensional Euclidean space.

In order to solve the above problems, the at least one aspect of this invention adopts the following structures. A key generation apparatus for generating a key from biometric information, the key generation apparatus comprises; a processor; and a memory, the memory holding: a first feature vector indicating a feature of first biometric information; and a parameter for identifying one arrangement out of a sphere packing arrangement with a density less than 1 and more than a predetermined value, or a sphere covering arrangement with a density equal to or more than 1 and less than a predetermined value, the processor is configured to: identify one arrangement out of the sphere packing arrangement or the sphere covering arrangement based on the parameter; select a first point included in the one arrangement identified out of the sphere packing arrangement or the sphere covering arrangement; generate a first key by performing predetermined first conversion on the first point; and generate, based on the first feature vector and the first point, a template associated with the first biometric information.

The at least one aspect of this invention can accomplish high precision authentication in biometric encryption and biometric signing based on feature vectors in a high-dimensional Euclidean space.

Problems, configurations, and effects which are not mentioned above are explained in the following embodiments.

BRIEF DESCRIPTIONS OF DRAWINGS

The present invention can be appreciated by the description which follows in conjunction with the following figures, wherein.

DETAILED DESCRIPTION OF THE EMBODIMENT

Figure 1:
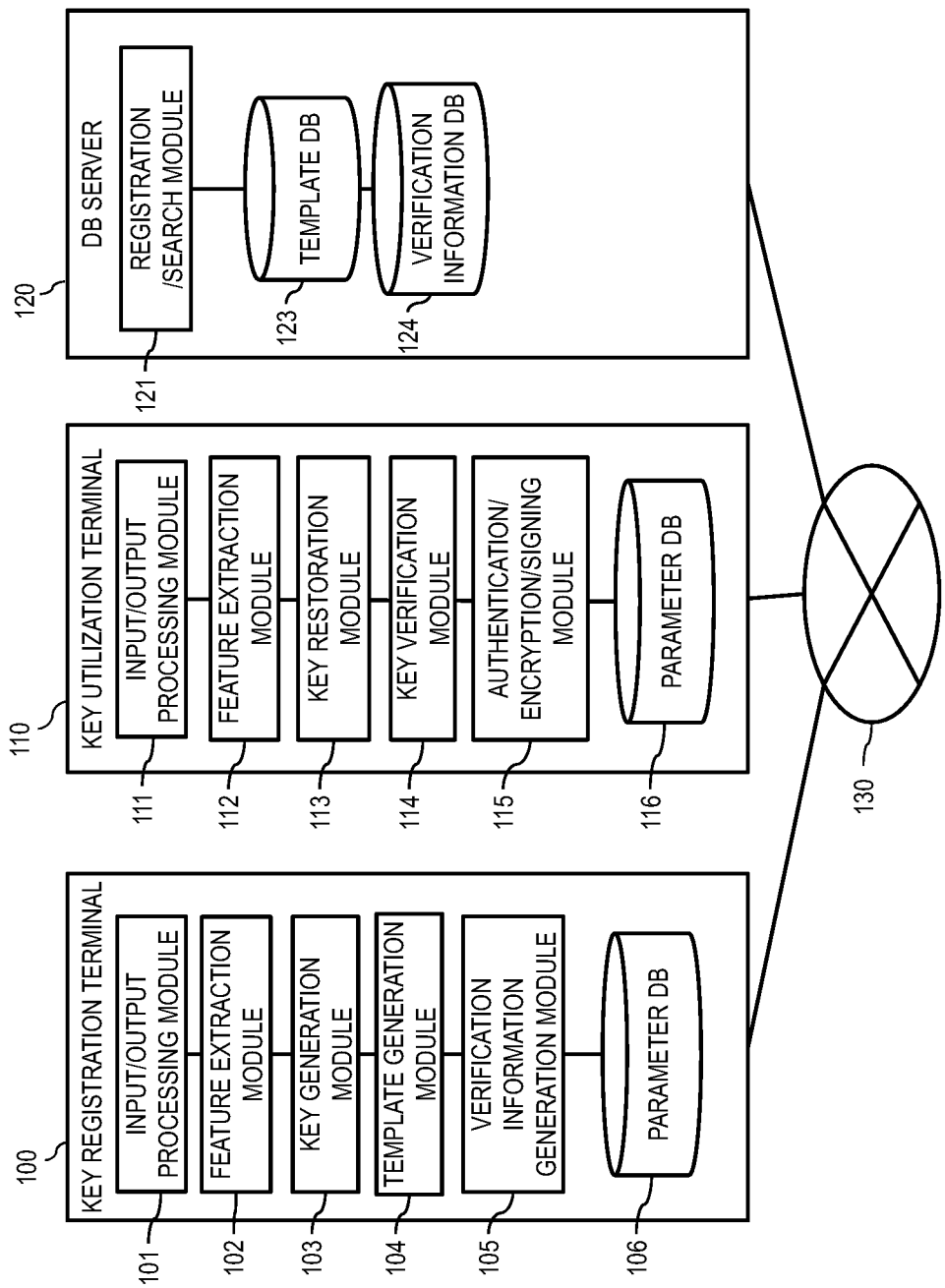
FIG. 1 is a block diagram for illustrating a configuration example of the biometric authentication system according to the First Embodiment.

In the following, an embodiment of the present invention is explained referring the attached drawings. The embodiment is an example to achieve the present invention and does not limit a technical range of the present invention. In the drawings, the same configuration has the same reference letter.

First Embodiment

A biometric authentication system in a first embodiment of this invention creates, from biometric information of a user, a template and verification information for verifying a key, registers the template and the verification information, restores the key with the use of the template and newly obtained biometric information of the user, and uses the key to execute user authentication, data encryption and decryption, creation of an electronic signature, and the like.

FIG. 1 is a block diagram for illustrating a configuration example of the biometric authentication system. The biometric authentication system includes, for example, one, or more than one, key registration terminal 100, one, or more than one, key utilization terminal 110, and a database (DB) server 120, which are coupled to one another by a network 130, which is the Internet or the like.

Two of or all three of the key registration terminal 100, the key utilization terminal 110, and the DB server 120 may be implemented in one same apparatus. When those three are all implemented in the same apparatus, the network 130 may be omitted.

The key registration terminal 100 creates the template and the verification information from biometric information of the user, and registers the template and the verification information. The key registration terminal 100 includes, for example, an input/output processing module 101 which processes input from the user and from other apparatus as well as output from other apparatus, a feature extraction module 102 which extracts registration feature data from registration biometric information obtained about a face, veins, and the like from the user with a sensor, a key generation module 103 which generates a key, a template generation module 104 which generates the template from the registration feature data, and a verification information generation module 105 which generates the verification information used to verify correctness of a key generated by the key utilization terminal 110 (that is, whether the key generated by the key registration terminal 100 and the key generated by the key utilization terminal 110 match). The key registration terminal 100 also includes a parameter storage module 106 for holding, among others, parameters specifying sphere packing arrangement and sphere covering arrangement described later.

The key utilization terminal 110 newly obtains biometric information of the user, and restores a key from the obtained biometric information and a template to execute user authentication, data encryption and decryption, creation of an electronic signature, and the like.

The key utilization terminal 110 includes an input/output processing module 111 which processes input from the user and other apparatus as well as output from other apparatus, a feature extraction module 112 which extracts feature data from biometric information that is obtained with a sensor from the user, a key restoration module 113 which restores a key from the feature data and a template, a key verification module 114 which verifies correctness of the key, and an authentication/encryption/signing module 115 which executes authentication, encryption, decryption, generation of an electronic signature, and other types of cryptographic processing with the use of the key. The key utilization terminal 110 also includes a parameter storage module 116 which holds, among others, parameters specifying sphere packing arrangement and sphere covering arrangement described later.

The DB server 120 registers and manages templates and pieces of verification information. The DB server 120 includes a registration/search module 121 which registers and searches for a template and a piece of verification information. The DB server 120 also includes a template DB 123 in which templates are held and a verification information DB 124 in which pieces of verification information are held. The template DB 123 may hold user IDs in association with corresponding templates. The verification information DB 124 may hold user IDs in association with corresponding pieces of verification information.

The template DB 123 and the verification information DB 124 may be managed on different servers or different terminals in a distributed manner. The distribute management enhances safety from the risk of leakage more. At least one type of data out of templates and pieces of verification information may be stored and managed on the key utilization terminal 110. At least one type of data out of templates and pieces of verification information may be stored and managed on an IC card, a USB memory, a portable terminal, a sheet of paper on which a two-dimensional code of the data is printed, or other portable media, or on a smartphone or other personally managed terminals.

Figure 6:
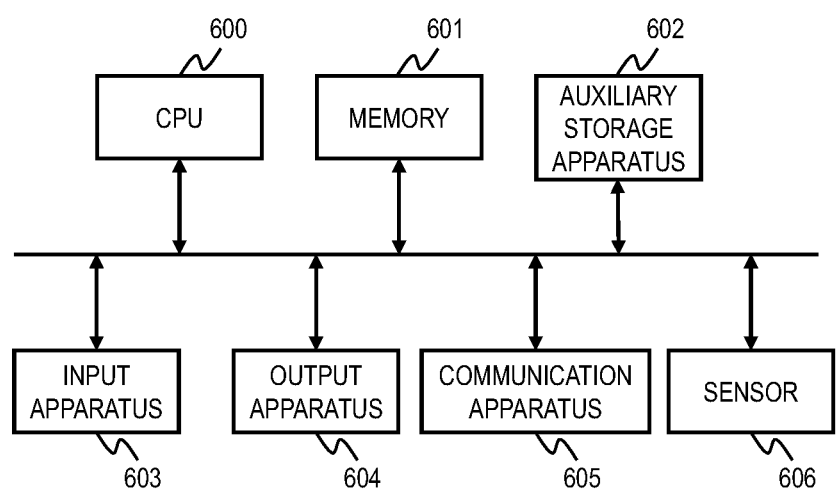
FIG. 6 is a block diagram for illustrating a hardware configuration example of computers from which a key registration terminal, a key utilization terminal, and a DB server are separately configured according to the First embodiment.

FIG. 6 is a block diagram for illustrating a hardware configuration example of computers from which the key registration terminal 100, the key utilization terminal 110, and the DB server 120 are separately configured. The computers each include a control processing unit (CPU) 600, a memory 601, an auxiliary storage apparatus 602, an input apparatus 603, an output apparatus 604, a communication apparatus 605, and a sensor 606, which are coupled to one another by a bus or a similar internal communication line. However, the computer from which the DB server 120 is configured is not required to include the sensor 606.

The CPU 600 includes a processor, and executes a program stored in the memory 601. The memory 601 includes a ROM, which is a nonvolatile memory device, and a RAM, which is a volatile memory device. The ROM stores, for example, an invariant program (for example, BIOS). The RAM is a dynamic random access memory (DRAM) or other such high-speed volatile memory device, and temporarily stores a program to be executed by the processor and data to be used at a time of execution of the program.

The auxiliary storage apparatus 602 is, for example, a magnetic storage device (HDD), a flash memory (SSD), or other such large-capacity nonvolatile storage apparatus, and stores the program to be executed by the CPU 600 and the data to be used at the time of the execution of the program. In other words, the program is read from the auxiliary storage apparatus 602, and loaded into the memory 601 to be executed by the CPU 600.

Each of the computers may include an input interface and an output interface. The input interface is an interface to which the input apparatus 603, such as a keyboard and a mouse, is coupled, and which receives input from an operator. The output interface is an interface to which the output apparatus 604, such as a display apparatus and a printer, is coupled, and which outputs a result of executing a program in a format visually recognizable to the operator. The communication apparatus 605 is a network interface apparatus which controls communication to and from other apparatus by following a given protocol. The sensor 606 is a sensor which obtains biometric information for identifying the user (for example, a photographing apparatus or a microphone). The sensor 606 may be coupled to the input interface instead of being included in each of the computers.

The program to be executed by the CPU 600 is provided to each of the computers from a non-transitory storage apparatus of other apparatus through intermediation of a removable medium (such as CD-ROM or flash memory) or through the network 130, and is stored in the nonvolatile auxiliary storage apparatus 602 being a non-transitory storage medium. Therefore, each of the computers preferably includes an interface which reads data from the removable medium.

Each of the apparatus included in the biometric authentication system in the first embodiment is a computer system formed on physically one computer or formed on a plurality of computers that are configured logically or physically, and may be operated on separate threads on the same computer, or may operate on a virtual machine built on a plurality of physical computer resources.

The feature extraction module 102, the key generation module 103, the template generation module 104, and the verification information generation module 105 of the key registration terminal 100 are implemented by programs executed by the CPU 600 of the computer from which the key registration terminal 100 is configured. Similarly, the feature extraction module 112, the key restoration module 113, the key verification module 114, and the authentication/encryption/signing module 115 of the key utilization terminal 110 are implemented by programs executed by the CPU 600 of the computer from which the key utilization terminal 110 is configured. The registration/search module 121 of the DB server 120 is similarly implemented by programs executed by the CPU 600 of the computer from which the DB server 120 is configured.

For example, the CPU 600 of the computer from which the key registration terminal 100 is configured functions as the input/output processing module 101 by operating in accordance with an input/output processing program loaded onto the memory 601, and functions as the feature extraction module 102 by operating in accordance with a feature extraction program loaded onto the memory 601. The same applies to a relationship between another function module included in the key registration terminal 100 and a program, and a relationship between a function module included in another apparatus that is a component of the authentication system and a program.

The parameter storage module 106 of the key registration terminal 100 is configured from, for example, a part of a storage area included in the memory 601, or the auxiliary storage apparatus 602, that is a component of the computer from which the key registration terminal 100 is configured. Similarly, the parameter storage module 116 of the key utilization terminal 110 is configured from a part of a storage area included in the memory 601, or the auxiliary storage apparatus 602, that is a component of the computer from which the key utilization terminal 110 is configured. The template DB 123 and the verification information DB 124 of the DB server 120 are similarly configured from a part of a storage area included in the memory 601, or the auxiliary storage apparatus 602, that is a component of the computer from which the DB server 120 is configured.

In the first embodiment, information used by each apparatus included in the authentication system does not depend on data structure and may have any data structure. For example, a data structure appropriately selected from a table, a list, a database, and a queue can be used to store the information.

Figure 2:
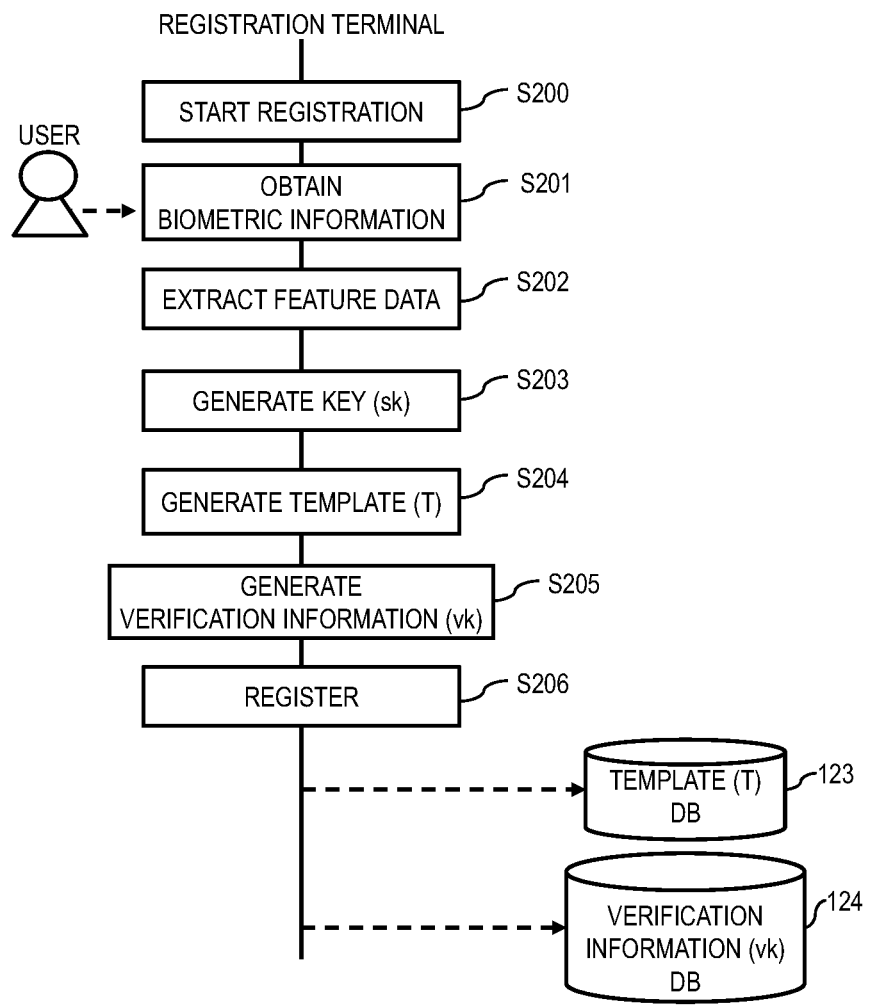
FIG. 2 is a flow chart for illustrating an example of processing of registering a template and verification information according to the First Embodiment.

FIG. 2 is a flow chart for illustrating an example of processing of registering a template and verification information. First, the input/output processing module 101 of the key registration terminal 100 starts registration processing in response to operation performed by the user or the operator (Step S200).

The input/output processing module 101 obtains the user's registration biometric information obtained by the sensor 606 of the key registration terminal 100 (Step S201). The input/output processing module 101 may assign a user ID for identifying the user in the processing of obtaining the registration biometric information. The term "biometric information" as used herein means information with which a user can be identified and which is obtained from physical features or behavioral features of the user. There can be an error between pieces of biometric information obtained about the same user at different times (biometric information can vary depending on situation, for example, a photographing angle or noise of the sensor 606, or the condition of the user himself or herself), and it can therefore be said that biometric information is fuzzy information.

Examples of biometric information include a still image or a moving image obtained by photographing a part of a body, such as a face, a hand, a finger, an eye, veins, an iris, or a retina with light having any predetermined wavelength, such as visible light, infrared light, near infrared light, or an X-ray, an audio signal of an utterance of the user, and pieces of signal information obtained by measuring various parts of the user's body. Data obtained by measuring a handwritten signature, a gesture, and an action is another example of biometric information. The same applies to key restoration biometric information in key utilization processing described later.

The feature extraction module 102 extracts registration feature data from the registration biometric information obtained in Step S201 (Step S202). A format in which the registration feature data is expressed is, for example, image, vector, signal, or one or more numerical values. The same applies to key restoration feature data in the key utilization processing described later.

The key generation module 103 generates a key sk from the registration feature data extracted in Step S202 (Step S203). The key sk may be a bit string having a predetermined length, an integer with a predetermined number of digits, or a vector or a matrix with a predetermined number of dimensions. Details of the processing step of Step S203 are described later.

The template generation module 104 generates a template T from the registration feature data generated in Step S202 (Step S204). Details of the processing step of Step S204 are described later. The processing step of Step S204 may be executed before the processing step of Step S203, or may be executed after a processing step of Step S205.

The verification information generation module 105 generates verification information vk from the key sk generated in Step S203 (Step S205). A detailed example of the processing step of Step S205 is described below.

As a first example of the method of generating the verification information vk from the key sk, the verification information generation module 105 calculates Expression 1 with the use of a predetermined one-way function Hash ( ).

$$vk=\text{Hash}(sk) \quad \text{(Expression 1)}$$

SHA256, SHA3, or any other cryptographic hash function is an example of Hash( ) A linear hash function is also an example of Hash( ).

As a second example of the method of generating the verification information vk from the key sk, the verification information generation module 105 calculates Expression 2 with the use of a cyclic group G=<g> ("g" is a generator of G) and a map φ from a set to which the key sk belongs to a set of all integers.

$$vk=g^\wedge\varphi(sk) \quad \text{(Expression 2)}$$

Pairs (sk, vk) formed in this manner can be used as pairs of a secret key and a public key in many public key encryption/electronic signature algorithms, such as ElGamal encryption/signature algorithms, the digital signature algorithm (DSA), and the Schnorr signature algorithm, or elliptic curve ElGamal encryption/signature algorithms, the elliptic curve DSA, and the elliptic curve Schnorr signature algorithm.

As a third example of the method of generating the verification information vk from the key sk, the verification information generation module 105 calculates Expression 3 with the use of a predetermined secret key for verification information generation in addition to the key sk, or a verification information generation parameter (p).

$$vk=\text{Enc}(sk,p) \quad \text{(Expression 3)}$$

AES, RSA, or any other cryptographic function, and a keyed hash function are each an example of Enc( ).

The verification information generation secret key or the verification information generation parameter (p) may be set for each user or for each piece of registered biometric information by the verification information generation module 105, or may be set for each key utilization terminal 110 or for each biometric authentication system by the verification information generation module 105, or may be set in advance. The set parameter (p) is stored in the parameter storage module 106.

Lastly, the input/output processing module 101 registers the template T in the template DB 123 of the DB server 120, and registers the verification information vk in the verification information DB 124 of the DB server 120 (Step S206). When Step S200 includes assigning of a user ID, the input/output processing module 101 registers the template T in association with the user ID in the template DB 123, and registers the verification information vk in association with the user ID in the verification information DB 124 of the DB server 120.

Figure 3:
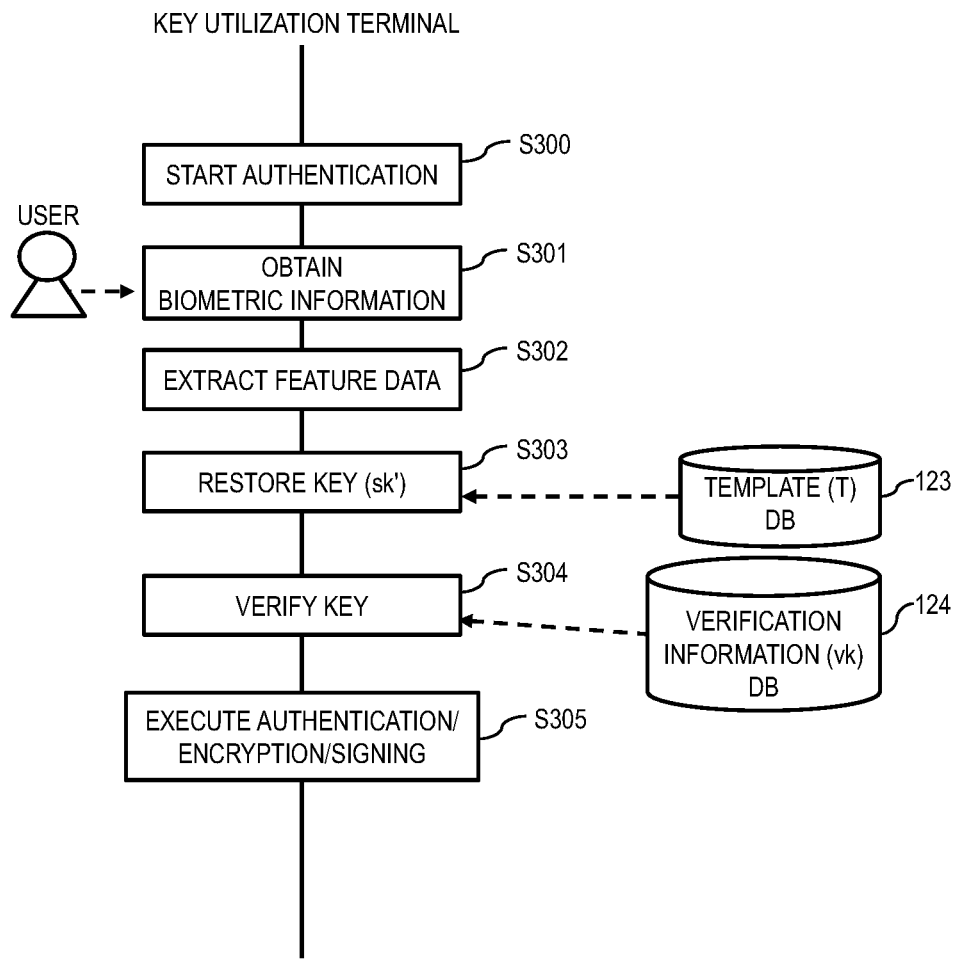
FIG. 3 is a flow chart for illustrating an example of authentication processing according to the First Embodiment.

FIG. 3 is a flow chart for illustrating an example of authentication processing. First, the input/output processing module 111 of the key utilization terminal 110 starts the authentication processing in response to operation performed by the user or the operator (Step S300). The input/output processing module 111 obtains authentication biometric information obtained about the user by the sensor 606 of the key utilization terminal 110 (Step S301). In a case of 1:1 authentication, the input/output processing module 111 also receives input of a user ID from the user in Step S301. The following description deals with the case in which 1:1 authentication is executed.

The feature extraction module 112 extracts authentication feature data from the authentication biometric information obtained in Step S301 (Step S302).

The authentication feature data is extracted by the same method as the extraction method in Step S202.

The input/output processing module 111 requests the DB server 120 to search the template DB 123 for the template T that is associated with the user ID obtained in Step S301, and read the associated template T out of the template DB 123, the registration/search module 121 of the DB server 120 reads the template T and transmits the read template T to the key utilization terminal 110, and the key restoration module 113 restores a key sk' from the received template T and from the authentication feature data (Step S303). Details of the processing step of Step S303 are described later.

The input/output processing module 111 requests the DB server 120 to search the verification information DB 124 for a piece of verification information vk that is associated with the user ID obtained in Step S301, and reads the associated piece of verification information vk out of the verification information DB 124, the registration/search module 121 of the DB server 120 reads the associated piece of verification information vk and transmits the read piece of verification information vk to the key utilization terminal 110, and the key verification module 114 verifies correctness of the key sk' (that is, whether sk'=sk is established) with the use of the received piece of verification information vk (Step S304).

A detailed example of the processing step of Step S304 is described below. In the processing step of Step S304, the key verification module 114 generates vk' from sk' by the same method as that in the processing step of Step S205 described above, and determines whether vk' and vk match by comparison. Specifically, when the method of the first example is employed in Step S205, the key verification module 114 calculates vk'=Hash(sk').

When the method of the second example is employed in Step S205, the key verification module 114 calculates vk'=g^φ(sk'). When the method of the third example is employed in Step S205, the key verification module 114 calculates vk'=Enc(sk', p) (however, the same value as the value in Step S205 is used for the verification information generation secret key or the verification information generation parameter (p)).

Whichever of the method of the first example, the method of the second example, and the method of the third example is used in Step S205, information about which method is to be used is shared in advance between the key registration terminal 100 and the key utilization terminal 110. When the method of the third example is used in Step S205, the verification information generation secret key or the verification information generation parameter (p) is shared in advance between the key registration terminal 100 and the key utilization terminal 110.

When the verification by the key verification module 114 in Step S304 is a success (that is, when sk' is determined to be equal to sk), the authentication/encryption/signing module 115 executes, for example, authentication processing, encryption processing, and/or signing processing requested by the user or the operator, with the use of the key sk' (=sk) (Step S305).

When authentication processing is to be executed, the authentication/encryption/signing module 115 generates, for, for example, a predetermined challenge code, an electronic signature or a message authentication code (MAC) with sk' as a secret key. When encryption processing is to be executed, the authentication/encryption/signing module 115 encrypts, for example, predetermined message data with sk' as an encryption key, and decrypts predetermined encrypted data with sk' as a decryption key. When electronic signing is to be executed, the authentication/encryption/signing module 115 generates, for, for example, predetermined data, an electronic signature with sk' as a signing key.

Figure 4:
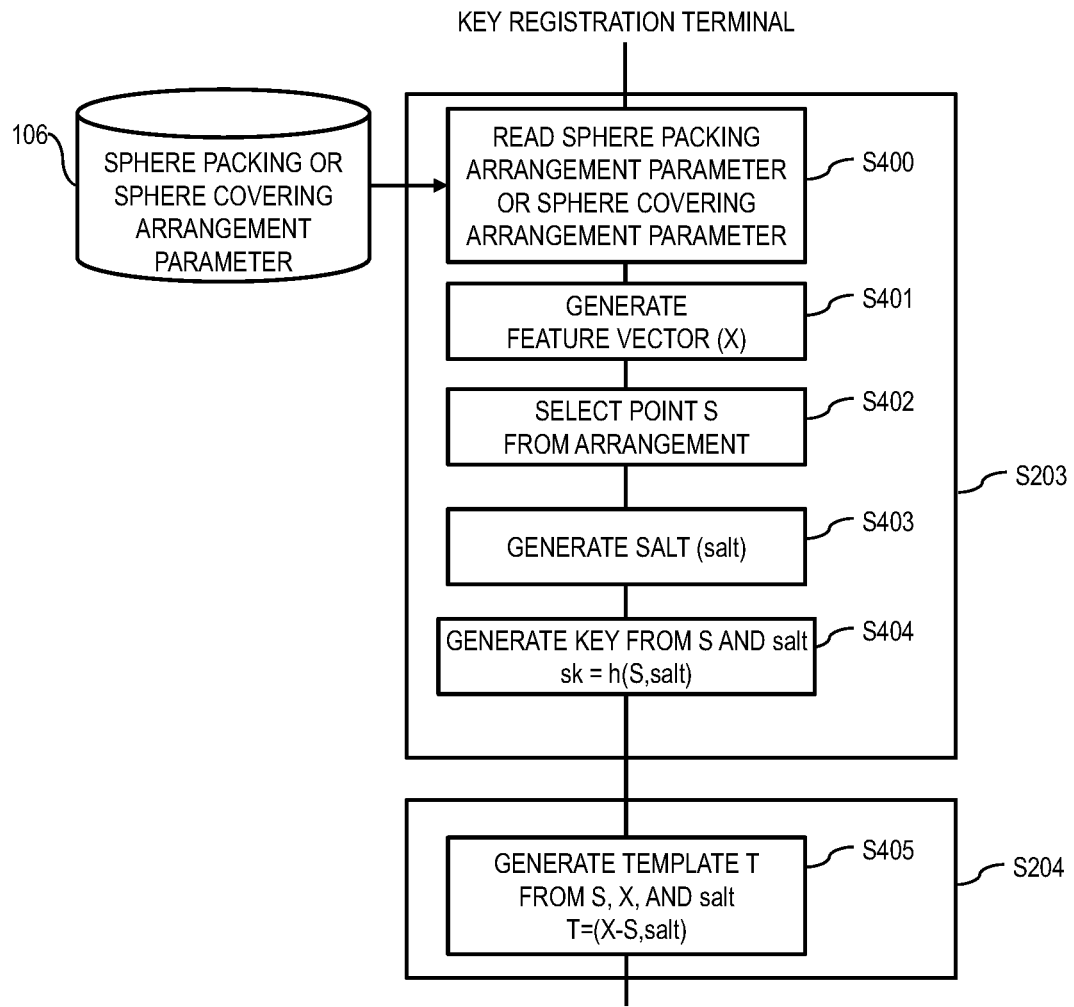
FIG. 4 is a flow chart for illustrating a detailed example of key generation processing and template generation processing according to the First Embodiment.

FIG. 4 is a flow chart for illustrating a detailed example of the key generation processing in Step S203 and the template generation processing in Step S204. Step S400 to Step S404 are processing steps included in Step S203, and Step S405 is a processing step included in Step S204.

The key generation module 103 of the key registration terminal 100 reads a sphere packing arrangement parameter or a sphere covering arrangement parameter out of the parameter storage module 106 (Step S400). The term "sphere packing arrangement parameter" means a parameter specifying a certain sphere packing arrangement, and the term "sphere covering arrangement parameter" means a parameter specifying a certain sphere covering arrangement.

Sphere packing arrangement is an arrangement in which, for each point $S\_i$ of an enumerable set $L=\{S\_i|i=0, 1, 2 \ldots\}$ in an n-dimensional Euclidean space, an n-dimensional hypersphere having a predetermined radius "r" (for example, r=1) is formed about that point $S\_i$ to form a set of n-dimensional hyperspheres, in a manner that avoids an overlap between the hypersphere formed about one point $S\_i$ and the hypersphere formed about another point $S\_i$.

Sphere covering arrangement is an arrangement in which, for each point $S\_i$ of an enumerable set $L=\{S\_i|i=0, 1, 2 \ldots\}$ in an n-dimensional Euclidean space, an n-dimensional hypersphere having a predetermined radius "r" is formed about that point $S\_i$ to form a set of n-dimensional hyperspheres, and the set of n-dimensional hyperspheres covers the entire n-dimensional space without leaving a gap. The dimension number n here is the same as the dimension number n of a feature vector described later, for example, about several tens to several ten thousands. In the following description, sphere packing arrangement or sphere covering arrangement may simply be referred to as "arrangement."

When the arrangement $L=\{S\_i\}$ mathematically has a structure of a lattice, L is called a lattice arrangement. A lattice arrangement can be specified with a basis matrix B of a space to which the lattice belongs, and the basis matrix B may therefore be used as a sphere packing arrangement parameter or a sphere covering arrangement parameter.

In one arrangement, the proportion of a volume of spheres (in the case of a sphere covering arrangement, the volume of overlapping portions of spheres is added in a duplicating manner) to the space is referred to as "density." The density in a sphere packing arrangement is a value more than 0 and equal to or less than 1, and the density in a sphere covering arrangement is a value equal to or more than 1. A sphere packing arrangement with the highest density is referred to as "the densest sphere packing arrangement," and a sphere covering arrangement with the lowest density (the sparsest) is referred to as "the sparsest sphere covering arrangement."

The densest sphere packing arrangement and the sparsest sphere covering arrangement in an n-dimensional space vary depending on the dimension number n. Specific methods of configuring the densest sphere packing arrangement and the sparsest sphere covering arrangement are known for some values of the dimension number n. For example, when the dimension number n is 24, an arrangement called a Leech lattice is known to be the densest sphere packing arrangement.

Various methods regarding how to configure a dense sphere packing arrangement, although not the densest arrangement, and how to configure a sparse sphere covering arrangement, although not the sparsest arrangement, are known for spaces of higher order of dimensions as well. For example, an arrangement called a Barnes-Wall lattice (BW lattice) is known as a method of configuring a dense sphere packing arrangement.

The first embodiment uses a sphere packing arrangement with a density less than 1 and more than a predetermined value (the predetermined value may vary depending on the dimension number of the space), or a sphere covering arrangement with a density equal to or more than 1 and less than a predetermined value (the predetermined value may vary depending on the dimension number of the space). Those arrangements are therefore configured in advance and parameters specifying the configured arrangements are stored in the parameter storage module 106 and the parameter storage module 116. Owing to this feature, biometric encryption and biometric signing using a feature vector in a high-dimensional Euclidean space which are difficult with the related art are accomplished with high precision. A reason therefor is described later.

In "Closest Vector Problem on Triangular Lattice and its Application to Fuzzy Signature," there is disclosed a method of biometric signing using a triangular lattice. However, a triangular lattice is not dense at all as a sphere packing arrangement and is not sparse at all as a sphere covering arrangement in a high-dimensional space (n is several tens or more). Application of a triangular lattice to actual biometric information consequently causes a significant drop in precision and is therefore impractical.

One arrangement $L=\{S\_i|i=0, 1, 2 \ldots\}$ and an arrangement $t\cdot L=\{t\cdot S\_i|i=0, 1, 2 \ldots\}$, which is a scaled version of the arrangement L obtained by multiplication by "t" ("t" is a positive real number), have the same density irrespective of the value of "t."

In the first embodiment, "t" also plays the role of an "authentication threshold value" in general biometric authentication systems, and probabilities of being accepted are higher for the authentic user as well as other people at a larger value of "t," with a smaller value of "t" increasing the probabilities of rejection for other people as well as the authentic user. Each sphere packing arrangement parameter or each sphere covering arrangement parameter may include information of "t." When the authentication threshold value "t" is to be varied from user to user (for example, the user specifies the value of "t" when biometric information is obtained in the template registration processing), "t" may be included in the template T.

Subsequently, the key generation module 103 converts and normalizes the registration feature data to generate a registration feature vector $X=(X\_1 \ldots X\_n)$ (Step S401).

The vector X is a vector in an n-dimensional Euclidean space, and a distance "d" (X, X') from a key restoration feature vector $X'=(X'\_1 \ldots X'\_n)$ described later is defined by a Euclidean distance expressed by Expression 4.

$$d(X,X')=((X\_1-X'\_1)^2+ \ldots +(X\_n-X'\_n)^2)^{(1/2)} \quad \text{(Expression 4)}$$

As an example of the method of generating such a feature vector in an n-dimensional Euclidean space, a method in which deep learning, principal component analysis, discrimination analysis, and other machine learning methods are used to generate a feature vector from biometric information or from feature data, or to learn a feature vector extractor is known. Generally speaking, the dimension number n of a feature vector is required to be several tens to several ten thousands in order to accomplish a practical precision of authentication, and it should be noted that dealing with a high-dimensional Euclidean space is accordingly a requirement.

The key generation module 103 selects a point S from the arrangement $L=\{S\_i | i=0, 1, 2 \ldots \}$ specified by the sphere packing arrangement parameter or the sphere covering arrangement parameter (Step S402). As a specific method of selecting the point S, the key generation module 103 may use, for example, one of the following methods.

(a) The key generation module 103 selects S at random in accordance with a predetermined distribution defined in L. This distribution may be, for example, a discrete normal distribution with L as a support, or a uniform distribution in a predetermined finite subset of L.

(b) The key generation module 103 selects a point closest to the registration feature vector X (hereinafter also referred to as "the nearest neighbor point of X") out of L.

(c) When L is a lattice arrangement, the key generation module 103 calculates a vector $Y=B^{(-1)}X$ by multiplying X by an inverse matrix of the basis matrix B of the lattice arrangement. The key generation module 103 calculates, as Z, an integer vector by rounding down or up each component of Y to the closest whole number. The key generation module 103 selects, as S, a vector S=BZ, which is obtained by multiplying the basis matrix B by the integer vector Z.

When the key generation module 103 uses the method (b) or the method (c), the absolute value of each component of a differential vector D, which is described later and calculated by Expression 8, is smaller than when the method of (a) is used. The data size of the template T is accordingly smaller when the key generation module 103 uses the method of (b) or (c) than when the method of (a) is used, with the result that efficient recording is accomplished.

The key generation module 103 subsequently generates a value called salt (Step S403). The key generation module 103 may generate, for example, a letter string or a bit string that has a predetermined length, or a random numerical value within a predetermined range, as the salt. The key generation module 103 may also use, as the salt, a user ID, a counter value, or another value that varies from user to user or from one piece of registered biometric information to another piece of registered biometric information. The salt is desired to have a length (s bits) at which a brute-force attack is difficult, for example, about 128 bits (s=128) or more.

The key generation module 103 is not required to execute the processing step of Step S403 and, in this case, the salt is not required to be used in the subsequent processing. In this case, the salt in the subsequent processing is read as a letter string or a bit string that has a length of 0.

The key generation module 103 then generates the key sk from the point S and the salt (Step S404). Specifically, the key generation module 103 calculates sk by Expression 5 using a one-way function Hash ( ) for example, SHA256 or SHA3.

$$sk=\text{Hash}(S \| salt) \quad \text{(Expression 5)}$$

In the expression, $\|$ indicates data concatenation. The key generation module 103 may use a linear hash function to calculate sk. The key generation module 103 may calculate sk also by Expression 6, which uses AES or another encryption function or a keyed hash function Enc( ) and a predetermined parameter (p).

$$sk=enc(s\|salt,p) \quad \text{(Expression 6)}$$

The key generation module 103 may calculate sk also by Expression 7, which uses a linear function "f" and an appropriate map "g."

$$sk=f(S)+g(salt) \quad \text{(Expression 7)}$$

This concludes the description of the detailed example of the key generation processing in Step S203.

A detailed example of the template generation step (Step S204) is described next. The template generation module 104 calculates the differential vector D, which is obtained by subtracting the registration feature vector X from the point S, with the use of Expression 8 to generate the template T=(D, salt) in which D and the salt are paired (Step S405).

$$D=X-S \quad \text{(Expression 8)}$$

The template generation module 104 may calculate D as S+X or as S−X.

Figure 5:
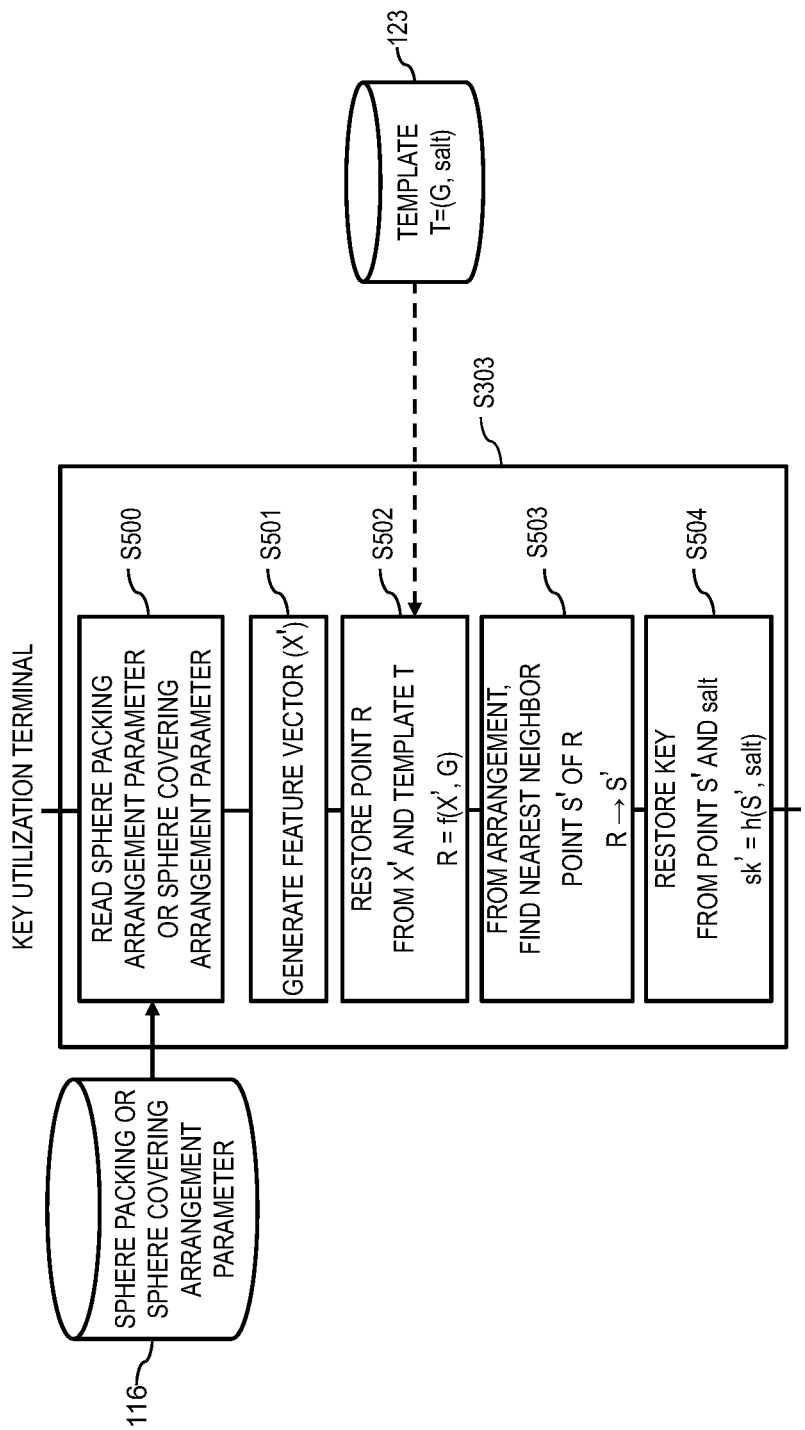
FIG. 5 is a flow chart for illustrating a detailed example of key restoration processing according to the First Embodiment.

FIG. 5 is a flow chart for illustrating a detailed example of the key restoration processing in Step S303. The key restoration module 113 of the key utilization terminal 110 reads a sphere packing arrangement parameter or a sphere covering arrangement parameter (a parameter for an arrangement used by the key registration terminal 100 in key generation and template generation) out of the parameter storage module 116 (Step S500). Information indicating which of sphere packing arrangement and sphere covering arrangement is to be used by the key registration terminal 100 in key generation and template generation is shared in advance with the key utilization terminal 110.

The key restoration module 113 converts and normalizes the authentication feature data to generate the authentication feature vector $X'=(X'\_1 \ldots X'\_n)$ (Step S501). The key restoration module 113 calculates a point R from the authentication feature vector X' and from the template T=(D, salt) (Step S502). Specifically, the key restoration module 113 calculates the point R by calculating, for example, Expression 9.

$$R=X'-D \quad \text{(Expression 9)}$$

From Expression 8 and Expression 9, Expression 10 is established.

$$R=X'-(X-S)=S+(X'-X) \quad \text{(Expression 10)}$$

The key restoration module 113 searches the arrangement L for a nearest neighbor point S' of the point R (Step S503). From Expression 10, the nearest neighbor point S' of the point R is expected to match S when X'−X is a sufficiently short vector, that is, when the authentication feature vector X' is sufficiently close to the registration feature vector X. When X' is not close to X, on the other hand, S' and S are expected to differ from each other. It is accordingly expected that S'=S is established when the authentication biometric information is information of the registered person himself or herself, and is not established in the case of a different person.

The key restoration module 113 generates the key sk' from the point S' and from the salt included in the template T=(D, salt) (Step S504). A specific method of generating the key sk' is the same as the method of generating the key sk in Step S404. It is expected that sk=sk' is satisfied when S'=S is established, and that sk=sk' is not satisfied when S'=S is not established. Accordingly, the correct key can be restored only when the authentication biometric information is input by the correct user himself or herself.

In a case of 1:N authentication, the input/output processing module 111 does not obtain the user ID in Step S301, and, for example, obtains every template T from the template DB 123 of the DB server 120 in Step S303. The input/output processing module 111 further obtains, in Step S304, every piece of verification information from the verification information DB 124 of the DB server 120. For example, the process of Step S303 is executed for each and every template T separately, and the processing step of Step S304 is executed for each and every piece of verification information separately.

As described above, the authentication system in the first embodiment is characterized by the use of a high-density sphere packing arrangement or a low-density sphere covering arrangement, and thus has an effect in that a higher precision of authentication than in biometric encryption methods and biometric signing methods of the related art is accomplished. The reason therefor is described below.

A condition to be met by the authentication feature vector X' in order to be accepted as a feature of the registered person himself or herself is originally defined to be equal to or less than a predetermined threshold value "r" in terms of the Euclidean distance d (X, X') from the registration feature vector X. In other words, a set of acceptable values of X' (an acceptable area) is a hypersphere having the radius "r" and centered about X in an n-dimensional space.

Meanwhile, in the key restoration processing in biometric encryption and biometric signing in the first embodiment, the correct key sk is restored and the person being authenticated is accepted as the registered person when and only when the nearest neighbor point of the point R=S+(X'−X) of Expression 10 out of the arrangement L={S_i|i=0, 1, 2 . . . } in the n-dimensional space is S. When an area in which S is the nearest neighbor point (a Voronoi cell of S) in the n-dimensional space is given as V(S), a necessary and sufficient condition for X' being accepted can be expressed by Expression 11.

$$S+X'-X \in V(S) \Leftrightarrow X' \in X-S+V(S) \quad \text{(Expression 11)}$$

In Expression 11, X−S+V(S) on the right-hand side of the expression is an area reached by a parallel shift of V(S) by X−S. When V(S) is assumed to be a hypersphere centered about S and having the radius "r," the right-hand side is a hypersphere centered about X and having the radius "r." This matches the above-mentioned acceptable area based on the Euclidean distance and matches in precision of authentication as well, and no drop in precision is accordingly caused. However, with respect to each point S in the arrangement L, a Voronoi cell of the point S in general does not match a hypersphere and the precision drops. Generally speaking, the magnitude of the drop in precision is greater when an area in which the hypersphere and the Voronoi cell do not match is larger.

A Voronoi cell of each point in a sphere packing arrangement about hyperspheres each having the radius "r" includes, by definition, a hypersphere having the radius "r." When the density thereof is higher, an area in which the Voronoi cell and the hypersphere do not match is smaller and the magnitude of drop in precision is accordingly smaller. Similarly, a Voronoi cell of each point in a sphere covering arrangement about hyperspheres each having the radius "r" is included in a hypersphere having the radius "r." When the density thereof is lower, an area in which the Voronoi cell and the hypersphere do not match is smaller and the magnitude of drop in precision is accordingly smaller.

With the biometric encryption technologies and the biometric signing technologies of the related art, for example, the method as described in "Fuzzy Extractors: How to Generate Strong Keys from Biometrics and Other Noisy Data" which uses a triangular lattice, when the dimension number n is 4 or larger, the density becomes increasingly rapidly lower for a sphere packing arrangement, and becomes increasingly rapidly higher for a sphere covering arrangement. The magnitude of drop in precision accordingly becomes greater. In the case of, for example, the BW lattice and the Leech lattice, on the other hand, the density is high for a sphere packing arrangement at a higher dimension as well, and the magnitude of drop in precision is accordingly small.

For the reason described above, the authentication system in the first embodiment enables biometric encryption and biometric signing in which a high precision of authentication (that is, a rate at which an authentic user is accepted and a rate at which other people are rejected are high) is accomplished.

Although the authentication system in the first embodiment executes generation of a key, a template, and verification information, key restoration, key verification, and the like based on biometric information, information on which the execution is based is not limited to biometric information for identifying a human, and the authentication system may execute generation of a key, a template, and verification information, key restoration, key verification, and the like based on fuzzy information for identifying an individual (for example, a physically unclonable function (PUF) for identifying a semiconductor device).

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A key generation apparatus for generating a key from biometric information, the key generation apparatus comprising:
a processor; and
a memory,
the memory holding:
a first feature vector indicating a feature of first biometric information; and
a parameter for identifying one arrangement out of a sphere packing arrangement with a density less than 1 and more than a predetermined value, or a sphere covering arrangement with a density equal to or more than 1 and less than a predetermined value,
the processor being configured to:
identify one arrangement out of the sphere packing arrangement or the sphere covering arrangement based on the parameter;
select a first point included in the one arrangement identified out of the sphere packing arrangement or the sphere covering arrangement;
generate a first key by performing predetermined first conversion on the first point; and
generate, based on the first feature vector and the first point, a template associated with the first biometric information.

2. The key generation apparatus according to claim 1,
wherein the one arrangement identified in the parameter out of the sphere packing arrangement and the sphere covering arrangement is a lattice arrangement, and
wherein the processor is configured to:
multiply the first feature vector by an inverse matrix of a basis matrix of the lattice arrangement to calculate a vector Y;
round down or up each component of the vector Y to a closest whole number to calculate an integer vector Z; and
select, as the first point, a vector obtained by multiplying the basis matrix by the integer vector Z.

3. The key generation apparatus according to claim 1, wherein the processor is configured to select the first point at random in accordance with a predetermined distribution, from the one arrangement identified out of the sphere packing arrangement or the sphere covering arrangement.

4. The key generation apparatus according to claim 1, wherein the processor is configured to select, as the first point, a nearest neighbor point of the first feature vector in the one arrangement identified out of the sphere packing arrangement or the sphere covering arrangement.

5. The key generation apparatus according to claim 1, wherein the predetermined first conversion includes conversion by at least one of a hash function, a keyed hash function, an encryption function, or a linear hash function.

6. The key generation apparatus according to claim 1, wherein the processor is configured to generate, when the first key is restored, verification information for verifying validity of the restored first key, by performing predetermined second conversion on the first key.

7. The key generation apparatus according to claim 6, wherein the predetermined second conversion includes conversion by at least one of a hash function, a keyed hash function, an encryption function, or a linear hash function.

8. A key utilization apparatus for utilizing a key generated from biometric information, the key utilization apparatus comprising:
a processor; and
a memory,
the memory holding:
a template generated from first biometric information;
verification information for verifying a first key generated from the first biometric information;
a second feature vector indicating a feature of second biometric information; and
a parameter for identifying one arrangement out of a sphere packing arrangement with a density less than 1 and more than a predetermined value, or a sphere covering arrangement with a density equal to or more than 1 and less than a predetermined value,
the template being generated based on a first point and a first feature, the first point being included in the one arrangement identified based on the parameter out of the sphere packing arrangement or the sphere covering arrangement, the first feature indicating a feature of the first biometric information,
the first key being generated by performing predetermined first conversion on the first point,
the verification information being generated by performing predetermined second conversion on the first key,
the processor being configured to:
calculate, from the second feature vector and the template, a second point;
calculate, as a third point, a nearest neighbor point of the second point in the one arrangement identified out of the sphere packing arrangement or the sphere covering arrangement;
perform the predetermined first conversion on the third point to generate a second key; and
compare, to the verification information, a value obtained by performing the predetermined second conversion on the second key, to determine whether the first key and the second key are generated from biometric information of the same living body.

9. The key utilization apparatus according to claim 8, wherein, the processor is configured to execute, when it is determined that the first key and the second key are generated from biometric information of the same living body from the comparison of the value obtained by performing the predetermined second conversion on the second key to the verification information, at least one of authentication processing, encryption processing, or signing processing with use of the second key.

10. A key generation method by a key generation apparatus for generating a key from biometric information, the key generation apparatus holding:
a first feature vector indicating a feature of first biometric information; and
a parameter for identifying one arrangement out of a sphere packing arrangement with a density less than 1 and more than a predetermined value, or a sphere covering arrangement with a density equal to or more than 1 and less than a predetermined value,
the key generation method comprising:
identifying, by the key generation apparatus, one arrangement out of the sphere packing arrangement or the sphere covering arrangement based on the parameter;

selecting, by the key generation apparatus, a first point included in the one arrangement identified out of the sphere packing arrangement or the sphere covering arrangement;

generating, by the key generation apparatus, a first key by performing predetermined first conversion on the first point; and generating, by the key generation apparatus, based on the first feature vector and the first point, a template associated with the first biometric information.

* * * * *